US006624218B2

(12) United States Patent
Van Gysel et al.

(10) Patent No.: US 6,624,218 B2
(45) Date of Patent: Sep. 23, 2003

(54) PLASTICIZED POLYMER COMPOSITIONS

(75) Inventors: August Van Gysel, Solre le Chateau (FR); Jean-Claude Van Overvelt, Warchin (BE); André Nannan, Melle (BE); Pierre Godard, Court-Saint-Etienne (BE); Jean-Jacques Biebuyck, Rixensart (BE); Philippe De Groote, Brussels (BE)

(73) Assignee: UCB, S.A., Brussels (BE)

( * ) Notice: Subject to any disclaimer, the term of this patent is extended or adjusted under 35 U.S.C. 154(b) by 0 days.

(21) Appl. No.: 10/095,701

(22) Filed: Mar. 13, 2002

(65) Prior Publication Data

US 2002/0165301 A1 Nov. 7, 2002

Related U.S. Application Data

(63) Continuation of application No. 09/704,551, filed on Nov. 3, 2000, now Pat. No. 6,384,115, which is a continuation of application No. 09/269,479, filed as application No. PCT/BE97/00079 on Jun. 4, 1997, now abandoned.

(30) Foreign Application Priority Data

Sep. 30, 1996 (BE) .............................. 9600820

(51) Int. Cl.$^7$ .............................. C08K 5/435
(52) U.S. Cl. ...................... 524/169; 524/171; 524/514; 524/567; 524/593
(58) Field of Search .................. 524/169, 171, 524/514, 567, 593

(56) References Cited

U.S. PATENT DOCUMENTS

| | | |
|---|---|---|
| 2,201,028 A | 5/1940 | Cordier |
| 2,244,183 A | 6/1941 | Austin |
| 2,292,464 A | 8/1942 | Moss |
| 2,499,932 A | 3/1950 | Sido |
| 3,335,107 A | 8/1967 | Dill |
| 3,491,147 A | 1/1970 | Hickner |
| 3,748,296 A | 7/1973 | Balbach et al. |
| 3,803,072 A | 4/1974 | Graham et al. |
| 4,399,246 A | 8/1983 | Hyde |
| 4,707,513 A | 11/1987 | Baer |
| 4,749,679 A * | 6/1988 | Yoshida et al. |
| 5,032,633 A | 7/1991 | Schlobohm |
| 6,384,115 B1 * | 5/2002 | Van Gysel et al. |

FOREIGN PATENT DOCUMENTS

| | | | |
|---|---|---|---|
| DE | 866248 | | 7/1949 |
| FR | 912502 | | 4/1944 |
| FR | 2075146 | | 12/1970 |
| FR | 211.338 | | 10/1971 |
| FR | 0108006 | * | 5/1984 |
| FR | 2602515 | * | 2/1988 |
| GB | 455695 | | 10/1936 |

OTHER PUBLICATIONS

JP 6/286036 (Derwent's Abstract AN 94–363177), Tokai Rubber Ind., Ltd.; Fuel Hose of Motor Car Having Good Cracking Resistance—Comprising Inner Layer of Fluorine–Contg. Resin, Polyamide Intermediate Layer and Braided Metallic Wire Outer Layer.

JP 2/221467 (Derwent's Abstract AN 90–310356/41); Permanent Adhesive Interlining Cloth Obtained by Applying Hot Melt Polyamide Adhesive Paste to Cloth Substrate.

SU 216,708 (Derwent's Abstract AN 68–31312Q), Esterification of Alkylsulphochlorides with Polyhydric.

* cited by examiner

Primary Examiner—Tae H. Yoon
(74) Attorney, Agent, or Firm—Finnegan, Henderson, Farabow, Garrett & Dunner, LLP

(57) ABSTRACT

The invention relates to compositions comprising at least one polymer and at least one plasticizer, in which compositions the polymer is semi-crystalline and exhibits a processing temperature equal to or greater than 220° C., preferably 250° C., and the plasticizer is an aromatic benzenesulphonamide represented by the general formula (I)

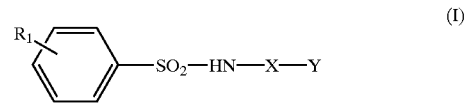

in which
 $R_1$ represents a hydrogen atom, a $C_1$–$C_4$ alkyl group or a $C_1$–$C_4$ alkoxy group,
 X represents a linear or branched $C_2$–$C_{10}$ alkylene group, or
  a cycloaliphatic group, or
  an aromatic group,
 Y represents one of the groups OH or

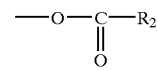

$R_2$ representing a $C_1$–$C_4$ alkyl group or an aromatic group, these groups optionally themselves being substituted by an OH or $C_1$–$C_4$ alkyl group.

The aromatic benzenesulphonamides have little volatility and exhibit good thermal stability, which makes it possible to effectively plasticize polyamides which are processed at high temperatures, such as polyamides-6, -6,6, -4,6, -6,9, -6,10, -6,12 and MDX-6 and polyketones, but also polyamides-11 and -12, polyoxymethylene and poly(vinylidene fluoride).

14 Claims, No Drawings

PLASTICIZED POLYMER COMPOSITIONS

This application is a continuation of application Ser. No. 09/704,551, filed Nov. 3, 2000, now U.S. Pat. No. 6,384,115, which is incorporated by reference herein, and which is a continuation of application Ser. No. 09/269,479, filed Jul. 14, 1999, now abandoned which is a U.S. national stage filing of PCT/BE97/00079, filed Jul. 4, 1997.

The present invention relates to semi-crystalline polymer compositions plasticized with aromatic sulphonamides in which the nitrogen atom contains a substituent carrying a hydroxyl or oxycarbonyl group.

The problem of plasticizers in polymers is well known in the state of the art. Reference may be made, on this subject, to the work "Encyclopedia of Polymer Science and Engineering", published by Wiley, 1989, Supplement Vol., pp. 568–647, for example, or alternatively to the book "The Technology of Plasticizers", J. K. Sears and J. R. Darby, John Wiley and Sons Inc., 1982.

It is well known that semi-crystalline polymers, such as polyamide-6, polyamide-6,6, polyamides-4,6, -6,10 and -6,12 and some polyketones, are very difficult to plasticize because of their high melting temperature and of the low compatibility between these polymers and the plasticizers known in the state of the art. This is because, if it is desired to incorporate a plasticizer above these high melting temperatures, typically from 250 to 300° C., and even 340° C. for polyamide-4,6, the plasticizer rapidly degrades, colouring the polymer, and its destruction does not make it possible to effectively plasticize the polymer; in addition, the plasticizer can also evaporate. Such is the case if attempts are made to use, as plasticizer for these polyamides, N-n-butylbenzenesulphonamide or N-ethyl-p-toluenesulphonamide, for example, plasticizers widely used on an industrial scale to plasticize polyamides with lower melting temperatures. One way of alleviating these disadvantages is to process the polymer so that the plasticizer is only found at a high temperature for the shortest possible time but this way of operating causes great technical difficulties, including very high losses of the plasticizer, problems of air pollution related to the sudden evaporation and/or thermal degradation of the plasticizer, and the like.

In addition to the criterion of good thermal stability which must be exhibited by plasticizers for semi-crystalline polymers with high melting temperatures, there is also the problem of the possible migration from the polymer of these plasticizers with time.

As regards semi-crystalline polymers which have lower melting temperatures, such as polyamide-11, polyamide-12, polyoxymethylene or poly(vinylidene fluoride), for which polymers a plasticizer is incorporated at temperatures of the order of 220° C., the problem of the thermal stability of the plasticizer is less critical. However, the intrinsic volatility of a plasticizer such as N-n-butylbenzenesulphonamide can be the source of problems, such as a loss of the product, and smells, which will have to be eliminated by means of complex and expensive equipment.

It would therefore be advantageous to find plasticizers for semi-crystalline polymers with high melting temperatures, such as polyamide-6, polyamide-6,6, polyamides-4,6, -6,9, -6,10, -6,12 and MXD-6 and some polyketones, but also polyamide-11, polyamide-12, polyoxymethylene and poly(vinylidene fluoride), which would be stable at high temperatures ranging from 220 to 300° C. and even 340° C. for polyamide-4,6 without undergoing either consequent decomposition or consequent evaporation. These plasticizers should not migrate towards the surface of the polymer either, in order to avoid the problem of exudation. In addition, it goes without saying that these plasticizers should effectively exhibit plasticizing properties at least equivalent to and preferably better than those of the plasticizers known in the state of the art.

The Applicant Company has now found, surprisingly, a family of aromatic sulphonamides in which the nitrogen atom contains a substituent carrying a hydroxyl or oxycarbonyl group which fully meets all the requirements mentioned above for plasticizers for semi-crystalline polymers with a high melting temperature and a processing temperature equal to or greater than 220° C., preferably 250° C.

For this reason, the present invention relates to compositions comprising at least one polymer and at least one plasticizer, characterized in that a. the polymer is semi-crystalline and exhibits a processing temperature equal to or greater than 220° C., preferably 250° C., b. the plasticizer is an aromatic benzenesulphonamide represented by the general formula (I)

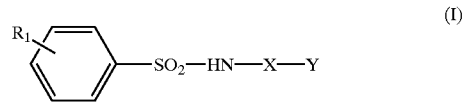

(I)

in which $R_1$ represents a hydrogen atom, a $C_1$–$C_4$ alkyl group or a $C_1$–$C_4$ alkoxy group, X represents a linear or branched $C_2$–$C_{10}$ alkylene group, or a cycloaliphatic group, or an aromatic group, Y represents one of the groups OH or

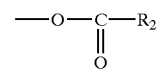

$R_2$ representing a $C_1$–$C_4$ alkyl group or an aromatic group, these groups optionally themselves being substituted by an OH or $C_1$–$C_4$ alkyl group.

The preferred aromatic benzenesulphonamides of formula (I) are those in which:

$R_1$ represents a hydrogen atom or a methyl or methoxy group,

X represents a linear or branched $C_2$–$C_{10}$ alkylene group or a phenyl group, Y represents an OH or —O—CO—$R_2$ group, $R_2$ representing a methyl or phenyl group, the latter being themselves optionally substituted by an OH or methyl group.

The semi-crystalline polymers to which the present invention relates are those for which the processing temperature is equal to or greater than 220° C., preferably 250° C., this processing temperature being imposed by the high melting temperature of these polymers. Mention may be made, among these, of polyamide-6, polyamide-6,6 and some polyketones, on account of the plasticization problems which they pose by virtue of their high melting temperature. The polyketones concerned here are condensation products of carbon monoxide with aliphatic olefins, for example the condensation product of carbon monoxide with ethene and propene. These polyketones are well known in the state of the art (mention may be made, without implied limitation, of Patents EP 485,058, EP 213,671 and EP 121,965, for example). The present invention also relates to polyamides-4,6, -6,9, -6,10, -6,12 and MDX-6. Other semi-crystalline polymers, such as polyamide-11, polyamide-12, polyoxymethylene and poly(vinylidene fluoride), can also be advantageously plasticized by the aromatic sulphonamides of formula (I).

Mention may be made, among the aromatic sulphonamides of formula (I) which are liquid (L) or solid (S) at room temperature as specified below, of the following products, with the abbreviations which have been assigned to them:

AS: N-(2-hydroxyethyl)benzenesulphonamide $C_6H_5SO_2NH(CH_2)_2OH$ (L)
AY: N-(3-hydroxypropyl)benzenesulphonamide $C_6H_5SO_2NH(CH_2)_3OH$ (L)
BC: N-(2-hydroxyethyl)-p-toluenesulphonamide $CH_3C_6H_4SO_2NH(CH_2)_2OH$ (S)
BE: N-(4-hydroxyphenyl)benzenesulphonamide $C_6H_5SO_2NHC_6H_4OH$ (S)
BF: N-[(2-hydroxy-1-hydroxymethyl-1-methyl)ethyl]-benzenesulphonamide $C_6H_5SO_2NHC(CH_3)(CH_2OH)CH_2OH$ (L)
BG: N-[5-hydroxy-1,5-dimethylhexyl] benzenesulphonamide $C_6H_5SO_2NHCH(CH_3)(CH_2)_3C(CH_3)_2OH$ (S)
BH: N-(2-acetoxyethyl)benzenesulphonamide $C_6H_5SO_2NH(CH_2)_2OCOCH_3$ (S)
BI: N-(5-hydroxypentyl)benzenesulphonamide $C_6H_5SO_2NH(CH_2)_5OH$ (L)
BK: N-[2-(4-hydroxybenzoyloxy)ethyl]benzenesulphonamide $C_6H_5SO_2NH(CH_2)_2OCOC_6H_4OH$ (S)
BL: N-[2-(4-methylbenzoyloxy)ethyl] benzenesulphonamide $C_6H_5SO_2NH(CH_2)_2OCOC_6H_4CH_3$ (S)
BJ: N-(2-hydroxyethyl)-p-methoxybenzenesulphonamide $CH_3OC_6H_4SO_2NH(CH_2)_2OH$ (S)
BM: N-(2-hydroxypropyl)benzenesulphonamide $C_6H_5SO_2NHCH_2CH(CH_3)OH$ (L)

The advantages introduced by the aromatic sulphonamides of formula (I) in the plasticization of the semi-crystalline polymers are many. Among these, mention may be made of:

the high thermal stability of the sulphonamides makes it possible to incorporate them in polymers at high temperature without them substantially evaporating, which prevents losses of the product and atmospheric pollution; they do not decompose at high temperature, which prevents unacceptable colouring of the polymer and allows them to act as plasticizer since they remain present intact in the polymer. It is consequently possible henceforth to use these new plasticizers for processing techniques (injection moulding, extrusion, extrusion blow-moulding, rotational moulding, and the like) at high temperatures and with contact times such that the plasticizers known in the state of the art cannot be used because of their volatility and/or their degradation at these temperatures, their high compatibility with the abovementioned polymers also promotes the development of their plasticizing properties, their plasticizing effect is reflected by a large decrease in the mechanical torque developed by the molten medium during mixing of the plasticizer with the polymer as well as during any processing of these compositions, which represents a large decrease in the energy to be used during these operations; the plasticizing effect is also reflected by a fall in the glass transition temperature, which results in a decrease in the stiffness of the articles obtained starting with these compositions, which can be measured by the fall in the elastic modulus, determined by the tensile test (ISO Standard 527-1 and 527-2), and by an improvement in the impact strength (measurable, for example, by the test known under the name of "Notched Izod impact" according to ISO Standard 180).

Some aromatic sulphonamides corresponding to the formula (I) have already been used as polymer plasticizers.

U.S. Pat. No. 3,748,296 describes aromatic sulphonamides mono- or disubstituted on the nitrogen atom by alkyl groups which can themselves be substituted by a hydroxyl, alkoxy or acyloxy group. These products are used, as plasticizers, solely for polyurethanes.

U.S. Pat. No. 2,201,028 also describes aromatic sulphonamides mono- or disubstituted on the nitrogen atom by alkyl groups carrying hydroxyl groups. These compounds are used, as plasticizers, solely for urea-formaldehyde resins, alone or as a mixture with cellulose polymers.

Patent GB 455,694 also describes aromatic sulphonamides mono- or disubstituted on the nitrogen atom by alkyl groups carrying ester or hydroxyl groups as plasticizers solely for ethers and cellulose ethers. The article by D. Aelony in Ind. Engineer. Chem., 46, pp. 587–591 (1954) describes esters of the same type as those in Patent GB 455,694 as plasticizers for vinyl resins alone.

U.S. Pat. No. 2,292,464 provides N-hydroxyalkyl-N-(aryl)arylsulphonamides as plasticizers for various polymers, essentially for cellulose derivatives; polyamides are mentioned among these polymers, without further details. In practice, the sulphonamides disubstituted on the nitrogen atom of this patent have plasticizing properties markedly inferior to those of aromatic sulphonamides monosubstituted on the nitrogen atom of formula (I) for semi-crystalline polymers with high melting temperatures according to the present invention.

Finally, Patent Application JP 2-221467 describes adhesives for textile pieces composed of a mixture of an N-hydroxyalkylated benzenesulphonamide and of a heat-meltable resin containing a polyamide; these adhesives can be used at 130° C.

As is well known to the person skilled in the art, it is impossible to predict what will be the properties of a compound which is a good plasticizer for a given polymer when attempts are made to use it as plasticizer for a polymer of a very different nature. Moreover, none of the abovementioned documents tackles the question of the plasticization of semi-crystalline polymers which can only be processed at high temperatures or explains the problems which this causes, no more than the solutions to be introduced thereto.

Aromatic sulphonamides other than those of formula (I) have already been provided as plasticizers for polyamides with high melting temperatures, such as polyamides-6, -6,6, and the like. Thus it is that, in U.S. Pat. No. 2,499,932, the reaction products of alcohols with N-alkylolarylsulphonamides are provided as plasticizers for these polyamides. These reaction products would be ethers of N-alkylolarylsulphonamides, but condensation reactions during the synthesis of these products could give rise to more complex molecules than a simple ether; the examples given of these products are all $C_1$–$C_8$ alkyl ethers of N-methyloltoluenesulphonamide. In fact, the thermal stability of this type of compound is much poorer than that of the aromatic sulphonamides of formula (I), as can be seen in Example 2 below. U.S. Pat. No. 2,244,183 provides, as plasticizer for the same polyamides, resins resulting from the condensation of formaldehyde with toluene- or cyclohexanesulphonamides optionally substituted by an alkyl group on the nitrogen atom. These resins have a much poorer plasticizing effect than the aromatic sulphonamides of formula (I).

The aromatic sulphonamides of formula (I) can be synthesized conventionally by reacting benzenesulphonyl chloride, optionally substituted on the benzene ring by an $R_1$ group according to the formula (I), with an amine of formula $NH_2$—X—Y, in which X has the meaning given above and Y represents a hydroxyl group, with heating in water or in an inert solvent, such as benzene or toluene, in the presence of a base, such as sodium hydroxide, pyridine or the amine $NH_2$—X—Y in excess; the benzenesulphonyl chloride is preferably added dropwise to the amine in aqueous or organic solution, care being taken that the pH does not fall below the value 9. When Y represents an —O—CO—$R_2$ group, $R_2$ having the meaning given above, a hydroxylated benzene-sulphonamide obtained as described above is esterified with the carboxylic acid or the anhydride corresponding to this Y group, optionally under catalytic conditions. Many examples of this type of synthesis are given in the literature, for example in the abovementioned article by D. Aelony.

The finished product is isolated according to the techniques well known to the person skilled in the art, for example by extraction with a third solvent chosen from aromatic or cycloaliphatic hydrocarbons, aliphatic esters or ketones or alternatively chlorinated solvents, such as chloroform. The isolation technique will depend on the solubility of the product synthesized.

The amount of the aromatic sulphonamide of formula (I) used according to the present invention depends on the polymer concerned and on its industrial application and most often varies from 2% to 30% and preferably from 5% to 20% by weight with respect to the total weight of the composition.

Various techniques can be used for introducing the aromatic sulphonamide of formula (I) into the semi-crystalline polymer according to the present invention. The most usual technique consists in mixing the plasticizer and the polymer in the molten state. The most widely used method industrially for doing this is extrusion. An aromatic sulphonamide of formula (I) existing in the liquid form at room temperature will be appropriately introduced via a metering pump in the feed zone of the extruder simultaneously with the polymer granules, the throughput of the metering pump being adjusted so as to provide a rod of the desired composition at the extruder outlet. If the aromatic sulphonamide of formula (I) exists in the solid form at room temperature, the polymer granules will be dry-mixed beforehand with the appropriate amount of the abovementioned product. The polymer granules, thus coated with plasticizer, will then be introduced into the feed zone of the extruder. For aromatic sulphonamides with low melting points, it is possible to feed the extruder with plasticizer in the molten state (liquid) via a pump equipped for this purpose. On a laboratory scale, use will conveniently be made of a thermostatically-controlled kneader in which rotate steel knives which homogenize the composition in the molten state, the polymer granules and the plasticizer having been dry-mixed beforehand.

It is also possible to introduce the sulphonamide of formula (I) into the semi-crystalline polymer by dissolving these products in a solvent or a mixture of solvents. This technique can advantageously be used for the preparation of samples in the form of films, for analytical purposes, for example.

Finally, it is also possible to obtain the compositions according to the invention by introducing the sulphonamide of formula (I) into the reactor in which the polymer is synthesized, either at the beginning of this synthesis or during or at the end of the latter.

The compositions according to the invention can additionally comprise additives usual for semi-crystalline polymers, such as impact reinforcements, inorganic fillers, antioxidants, UV stabilizers, processing aids, such as mould-release agents, and the like.

The compositions according to the invention lend themselves to the manufacture of finished components obtained by processes, such as extrusion and injection moulding, in which the plasticized polymer is processed in the molten state. Mention may be made, among the articles thus manufactured, of hydraulic brake cables, pipes, tubes, tanks and other engineering components.

On account of the excellent plasticization of the polymers targeted by the present invention, it is now possible to envisage the use of these in the same applications under easy processing conditions, which was not possible previously.

The examples which follow illustrate the invention without limiting it.

EXAMPLE 1

Synthesis of Aromatic Sulphonamides of Formula
(I)

(a) N-(2-hydroxyethyl)benzenesulphonamide (AS)

128.3 g of 2-ethanolamine (2.1 mol) and 150 g of water are introduced into a 1 liter reactor equipped with a thermostatically-controlled jacket, a stirrer and a dropping funnel. 353 g of benzenesulphonyl chloride (2 mol) are introduced into the dropping funnel. The reactor is heated to approximately 60° C. and the benzenesulphonyl chloride is then allowed to run dropwise into the reactor at the rate of approximately 3 ml/min. The exothermicity of the reaction is thus controlled and the temperature changes to reach 70 to 75° C. at the end of addition. The pH is prevented from falling below 9 by gradual addition of a 20% solution of sodium hydroxide in water. After a few hours, the reaction is complete. The reaction mixture is then extracted with a third water-insoluble solvent, such as ethyl acetate. This organic phase is collected. The aqueous phase is extracted and the combined organic phases are distilled under vacuum in order to remove the extraction solvent. 384 g of N-(2-hydroxyethyl)benzenesulphonamide are thus obtained, i.e. a yield of 95.5% with a purity of greater than 99%. This product, which is liquid at room temperature, is characterized by IR spectroscopy and NMR spectro-scopy, as well as by GC and HPLC analysis.

(b) N-(3-hydroxypropyl)benzenesulphonamide (AY)

The preparation is carried out as in Example 1(a) from 353 g of benzenesulphonyl chloride (2 mol) and 157.7 g of 3-amino-1-propanol (2.1 mol).

The amount obtained is 406.7 g, i.e. a yield of 99.5%.

(c) N-(2-hydroxyethyl)-p-toluenesulphonamide (BC)

The preparation is carried out as in Example 1(a) but this time 381.3 g of p-toluenesulphonyl chloride (2 mol) and 128.3 g of ethanolamine (2.1 mol) are used for the reaction.

The amount obtained is 400.8 g, i.e. a yield of 94.8%.

(d) N-(4-hydroxyphenyl)benzenesulphonamide (BE)

The preparation is carried out as in Example 1(a) from 353 g (2 mol) of benzenesulphonyl chloride and 229.2 g of 4-aminophenol (2.1 mol).

The amount obtained is 507.9 g, i.e. a yield of 97.3%.

(e) N-[(2-hydroxy-1-hydroxymethyl-1-methyl)ethyl]-benzenesulphonamide (BF)

The preparation is carried out as in Example 1(a) from 353 g (2 mol) of benzenesulphonyl chloride and 220.8 g of 2-amino-2-methyl-1,3-propanediol (2.1 mol).

The amount obtained is 475.7 g, i.e. a yield of 97%.

(f) N-[5-hydroxy-1,5-dimethylhexyl]benzenesulphonamide (BG)

In this case, 6-amino-2-methyl-2-heptanol hydrochloride (381.6 g, i.e. 2.1 mol) is neutralized and reacted with 353 g of benzenesulphonyl chloride (2 mol) according to Example 1(a).

Yield: 563.8 g, i.e. 98.8%.

(g) N-(2-acetoxyethyl)benzenesulphonamide (BH)

102.1 g of acetic anhydride are introduced into a 500 ml 3-necked round-bottomed flask and then 201.1 g of the sulphonamide as obtained in Example 1(a) are added dropwise.

Reaction is allowed to take place for 3 hours at 60–70° C. The reaction mixture is allowed to cool to room temperature and is poured into 400 ml of water, which causes the desired product to precipitate. It is filtered off and washed until the wash liquors are neutral;

Yield: 239.5 g, i.e. 98.5%.

(h) N-(5-hydroxypentyl)benzenesulphonamide (BI)

The preparation is carried out as in Example 1(a) from 353 g (2 mol) of benzenesulphonyl chloride and 216.6 g (2.1 mol) of 5-amino-1-pentanol.

Yield: 476.8 g, i.e. 98%.

(i) N-(2-hydroxyethyl)-p-methoxybenzenesulphonamide (BJ)

The preparation is carried out as in Example 1(a) from 413.3 g (2 mol) of p-methoxybenzenesulphonyl chloride and 128.5 g (2.1 mol) of ethanolamine.

Yield: 439.3 g, i.e. 95%.

EXAMPLE 2

Thermal Stability of the Plasticizers (a) The thermogravimetric technique was applied in evaluating the thermal stability of aromatic sulphonamides of formula (I) and, by way of comparison, of other aromatic sulphonamides. To do this, the loss in weight was measured for samples which were subjected to a preliminary heating, increasing by 10° C. per minute, from 30° C. to 220° C. and then maintained under isothermal conditions at this temperature for 30 minutes. Two other series of analyses were carried out with final isotherms at 270 and 300° C. These analyses were carried out in a thermogravimetric device of Perkin-Elmer TGA 7 type. The results are reported in Table I, in which:

- the first column indicates the nature of the plasticizer by an abbreviation explained at the foot of the table;
- the following columns indicate the residual % by weight with respect to the amounts employed, starting at 30° C., at the temperatures indicated and for the times, expressed in minutes, under isothermal conditions, which illustrates the thermal stability of the plasticizer under consideration. The times of 2 and 5 minutes were chosen arbitrarily, the isotherm being maintained for 30 minutes.

TABLE I

| Plasticizer | 220° C. | | 270° C. | 300° C. |
|---|---|---|---|---|
| | 2'ISOTH. | 5'ISOTH. | 2'ISOTH. | 2'ISOTH. |
| AS | 97 | 94 | 66 | 28 |
| AY | 96 | 92 | 2 | 1 |
| BE | 99 | 97 | 65 | 48 |
| BG | 87 | 74 | 15 | 8 |
| BF | 98 | 97 | 88 | 47 |
| BH | 85 | 75 | 29 | 6 |
| BI | 94 | 91 | 69 | 65 |
| BJ | 99 | 98 | 69 | 0 |
| BL | 99 | 98 | 92 | 76 |
| BM | 98 | 96 | 86 | 60 |
| EHPB* | 82 | 69 | 0 | 0 |
| EBSA* | 10 | 0 | 0 | 0 |
| BBSA* | 70 | 49 | 0 | 0 |
| BD* | 76 | 59 | — | — |
| AN* | 93 | 89 | 20 | 6 |
| BA* | 67 | 43 | 0 | 0 |
| AU* | 89 | 83 | 64 | 32 |
| AT* | 91 | 82 | 40 | 38 |

In Table I, the plasticizers labelled "*" are given by way of comparion.
The abbreviations of the plasticizers have the following meaning:
AS N-(2-hydroxyethyl)benzenesulphonamide
AY N-(3-hydroxypropyl)benzenesulphonamide
BE N-(4-hydroxyphenyl)benzenesulphonamide
BG N-[5-hydro-1,5-dimethylhexyl]benzenesulphonamide
BF N-[(2-hydro-1-hydroxymethyl-1-methyl)ethyl]-benzenesulphonamide
BH N-(2-acetoxyethyl)benzenesulphonamide
BI N-(5-hydroxypentyl)benzenesulphonamide
BJ N-(2-hydroxyethyl)-p-methoxybenzenesulphonamide
BL N-[2-(p-methylbenzoyloxy)ethyl]benzenesulphonamide
BM N-(2-hydroxypropyl)benzenesulphonamide
EHPB* 2-ethylhexyl p-hydroxybenzoate
EBSA* N-ethylbenzenesulphonamide
BBSA* N-n-butylbenzenesulphonamide
BD* N-n-butyl-p-toluenesulphonamide
AN* N-butyl-p-methoxybenzenesulphonamide
BA* N-(3-methoxypropyl)benzenesulphonamide
AU* N-ethyl-N-(2-hydroxyethyl)benzenesulphonamide
AT* N,N-di(2-hydroxyethyl)benzenesulphonamide This table clearly indicates that the aromatic sulphonamides AS, AY, BE, BG, BF, BH, BI, BJ, BL, BM and BO, which correspond to the formula (I), are more highly resistant to degradation and/or to evaporation due to heat than the aromatic sulphonamides, such as EBSA, BBSA, AN and BD, which contain an unsubstituted alkyl chain attached to the nitrogen atom. EHPB, another plasticizer known in the state of the art, clearly shows a lack of stability at 270° C. and 300° C.

The aromatic sulphonamide BA, which contains a methoxypropyl chain attached to the nitrogen atom, does not resist heat either. In contrast, the aromatic sulphonamides AT and AU, which carry two ethyl substituents attached to the nitrogen atom, at least one of which contains a hydroxyl group, are highly resistant to heat but their plasticizing properties leave something to be desired, as shown in the following test.

b) Components made of polyamide-12 (PA-12) were obtained in two stages. In a first stage, commercial polyamide-12 granules (Vestamid® L 1700, produced by Huls) are dried under vacuum at 100° C. for 8 hours. In a second stage, the polyamide granules, impregnated beforehand with plasticizer, were kneaded in a Brabender plastograph for 5 minutes at 220° C. at a stirring rate of 40 revolutions per minute and under a nitrogen atmosphere. The material thus obtained was then shaped in a mould with dimensions (150×150×1) mm at 220° C. under a pressure of 15 tonnes. The sheets emerging from the mould are machined into small rectangular bars with a length of 50 mm over a width of 5 mm and a thickness of 1 mm. The true modulus is evaluated at a temperature of 20° C., at a frequency of 1 Hz, under deformation of 0.1%, in a Rheometrics RSA-2 Solid Analyzer device.

The results are reported in Table II, in which:
the first column indicates the nature of the constituents of the compositions tested (PA, AS, AT and AU have the meaning given above);
the second column indicates the percentage by weight of the plasticizer introduced into the compositions with respect to the total weight of the latter;
the third column gives the true modulus in MPa.

TABLE II

| Nature of the compositions | Amount of plasticizer | True modulus, in MPa |
|---|---|---|
| PA-12 | 0% | 1760 |
| PA-12 + AS | 5% | 1170 |
| PA-12 + AS | 15% | 540 |
| PA-12 + AT* | 5% | 1600 |
| PA-12 + AT* | 15% | 900 |
| PA-12 + AU* | 5% | 1400 |
| PA-12 + AU* | 15% | 810 |

PA-12: Vestamid ® L 1700 Naturfarben, Hüls

The compositions labelled "*" are tested by way of comparison. This table shows that the aromatic benzenesulphonamides AT and AU, where the nitrogen atom carries 2 substituents, have plasticizing properties which are markedly inferior to those of AS, which corresponds to the invention.

EXAMPLE 3

Melt Index

Samples of compositions containing a semi-crystalline polyamide and an aromatic sulphonamide as plasticizer were prepared by mixing these two constituents in a Werner-Pfleiderer ZSK-30 corotating extruder at the processing temperature of the polyamide at a rotational speed of the screws of 110 revs/min, i.e. 220° C. for polyamide-12 (trade mark Vestamid® L 1700, produced by Hüls, containing 1% of black masterbatch) and 260° C. for polyamide-6 (trade mark Ultramid® B-3, produced by BASF). The liquid plasticizer is introduced at the head of the extruder via a metering pump with the trade mark Milton-Roy "A" (A 29 F 1 H). The plasticized polyamide rods thus obtained are then cooled by immersion in water at room temperature. They are then granulated and dried in a ventilated cabinet at 50° C. for 8 hours. The granules, thus dried, do not contain more than 0.2% of water. These granules are immediately placed, excluded from atmospheric moisture, in sealed bags, while awaiting the tests.

The melt index was determined according to ASTM Standard D 1238 for plasticizer-free polyamide-12 samples, as well as with increasing amounts of BBSA and of AS (the meaning of these abbreviations is given above), at 220° C. and under a pressure of 5 kg. The same determination was carried out for polyamide-6 alone, as well as with increasing amounts of AS, at 260° C. and under a pressure of 5 kg. The device used for these determinations is a Davenport Melt Flow Rate Apparatus (Model 4). The results are given in Table IV, in which:
the first column indicates the nature of the constituents of the compositions tested (PA, BBSA and AS have the meaning given above);
the second column indicates the percentage by weight of the plasticizer introduced into the compositions with respect to the total weight of the latter;
the third column gives the melt index of the compositions, in g per 10 minutes, the figures between brackets indicating the standard deviation of the tests;
the fourth column gives the temperature and pressure conditions of the tests.

TABLE III

| Nature of the compositions | Amount of plasticizer | Melt index (g/10 min) | Conditions |
|---|---|---|---|
| PA-12 | 0% | 6.32 (0.03) | 220° C., 5 kgs |
| PA-12 + BBSA* | 5% | 8.18 (0.04) | |
| PA-12 + BBSA* | 15% | 15.8 (0.4) | |
| PA-12 + AS | 5% | 8.1 (0.2) | 220° C., 5 kgs |
| PA-12 + AS | 15% | 12.8 (0.2) | |
| PA-6 | 0% | 22.4 (0.3) | 260° C., 5 kgs |
| PA-6 + AS | 5% | 32.8 (0.4) | |
| PA-6 + AS | 15% | >50 | |

The compositions labelled "*" are tested by way of comparison.
PA-12: Vestamid ® L 1700, Hüls
PA 6: Ultramid ® B-3, BASF The results of Table III show that the effect of AS is comparable with that of BBSA in a polyamide-12, as regards the increase in the melt index of the compositions containing them. Moreover, the introduction of AS into polyamide-6 causes an increase in the melt index which is even larger than for polyamide-12. This increase in the melt index reflects in all cases a decrease in the viscosity in the molten state, which is one of the expected properties of a plasticizer.

EXAMPLE 4

Test of Notched Impact Strength (Nothced Izod Impact)

The samples used in this test were obtained in the following way:

Polyamide granules obtained as in Example 3 are fed into a Buhler Rover 63B injection moulding machine, where the composition is treated at the same temperature as during extrusion. The moulded components provided by the injection moulding machine are immediately excluded from atmospheric moisture while awaiting the tests of notched impact strength described below according to ISO Standard 180. The results are reported in Table IV, in which:
the first column indicates the nature of the constituents of the compositions tested (PA, BBSA and AS have the meaning given above);
the second column indicates the percentage by weight of the plasticizer introduced into the compositions with respect to the total weight of the latter;
the third column gives the value of the notched impact strength in $kJ/m^2$, followed by the abbreviation "CB" if the sample has been broken into 2 separate fragments or by the abbreviation "NB" if the sample has not been completely broken; the figures between brackets give the standard deviation. The test is carried out at a temperature of 23° C.

TABLE IV

| Nature of the compositions | Amount of plasticizer | Izod Impact strength ($kJ/m^2$) | | |
|---|---|---|---|---|
| PA-12 | 0% | 9.2 | (0.5) | CB |
| PA-12 + BBSA* | 5% | 10.2 | (0.8) | CB |
| PA-12 + BBSA* | 15% | | | NB |

TABLE IV-continued

| Nature of the compositions | Amount of plasticizer | Izod Impact strength (kJ/m$^2$) | |
|---|---|---|---|
| PA-12 + AS | 5% | 11 (2) | CB |
| PA-12 + AS | 15% |  | NB |
| PA-6$^{(i)}$ | 0% | 4.4 (0.2) | CB |
| PA-6 + AS | 5% | 4.5 (0.1) | CB |
| PA-6 + AS | 15% | 20 (1) | CB |
| PA-6$^{(ii)}$ | 0% | 4.2 (0.1) | CB |
| PA-6 + AS | 5% | 3.8 (0.2) | CB |
| PA-6 + AS | 15% | 8.2 (0.5) | CB |
| PA-6 + BH | 5% | 3.6 (0.2) | CB |
| PA-6 + BH | 15% | 6.1 (0.3) | CB |

The compositions labelled "*" are tested by way of comparison.
PA-12: Vestamid ® L 1700 Naturfarben, Hüls, with black masterbatch (1%)
$^{(i)}$PA-6: Ultramid ® B-3 Natur, BASF, with black masterbatch (1%)
$^{(ii)}$PA-6: Ultramid ® B-35W Schwarz, BASF The results in Table IV show that the Izod notched impact strength increases to the same extent for polyamide-12, whether it is mixed with the same amounts of AS as of BBSA. This impact strength also increases for polyamide-6 containing 15% of AS or of BH, which clearly reflects the plasticizing effect of these benzenesulphonamides.

EXAMPLE 5

Tensile Tests on Polyamide Compositions

The mechanical properties of the samples mentioned in Example 4 and of others prepared under the same conditions were evaluated. By applying ISO Standard 527-1 to test specimens of 1 BA type (ISO 527-2), the modulus of elasticity, the yield stress, the breaking stress, the elongation at yield stress and the elongation at break were evaluated. To do this, a drawing rate of 50 mm per minute was used. The results are reported in Table V. In this table:

the first column indicates the nature of the constituents of the compositions tested (PA, BBSA and AS have the meaning given above) and the amount of plasticizer;

the second column gives the value of the modulus of elasticity in MPa;

the third column gives the value of the yield stress in MPa; for the virgin cases, no distinct value could be determined;

the fourth column gives the value of the elongation at yield stress in %; for the virgin cases, no distinct value could be determined;

the fifth column gives the breaking stress in MPa;

the sixth column gives the elongation at break in %.

Throughout Table V, the figures between brackets indicate the standard deviations.

TABLE V

| Nature of the compositions and amounts of plasticizer | Modulus of elasticity in MPa | | Yield stress in MPa | | Elongation at yield stress in % | | Breaking stress in MPa | | Elongation at break in % | |
|---|---|---|---|---|---|---|---|---|---|---|
| PA-12$^{(i)}$ | 900 | (30) | 43.2 | (0.9) | 5.9 | (0.3) | 47.3 | (0.8) | 179 | (8) |
| PA-12 + 5% BBSA* | 600 | (20) | 34 | (1) | 16.6 | (0.4) | 46 | (2) | 180 | (10) |
| PA-12 + 15% BBSA* | 290 | (10) |  |  |  |  | 43 | (1) | 229 | (9) |
| PA-12$^{(i)}$ | 900 | (30) | 43.2 | (0.9) | 5.9 | (0.3) | 47.3 | (0.8) | 179 | (8) |
| PA-12 + 5% AS | 590 | (20) | 35 | (0.7) | 16.7 | (0.3) | 48 | (3) | 190 | (10) |
| PA-12 + 15% AS | 320 | (20) |  |  |  |  | 44 | (2) | 220 | (20) |
| PA-12$^{(ii)}$ | 980 | (30) | 46 | (2) | 6.1 | (0.3) | 50.9 | (0.9) | 155 | (8) |
| PA-12 + 5% AS | 650 | (30) | 38 | (2) | 16.0 | (0.4) | 49.0 | (0.7) | 177 | (4) |
| PA-12 + 5% AS | 320 | (10) | 28.0 | (0.6) | 28.8 | (0.9) | 45 | (1) | 228 | (8) |
| PA-12 + 5% AY | 520 | (20) | 35.0 | (0.6) | 19.5 | (0.1) | 46.7 | (0.6) | 178 | (3) |
| PA-12 + 15% AY | 340 | (10) | 29.3 | (0.6) | 29.6 | (0.1) | 46 | (2) | 223 | (9) |
| PA-12 + 5% BH | 670 | (20) | 39 | (2) | 17.4 | (0.3) | 52 | (2) | 165 | (4) |
| PA-12 + 15% BH | 390 | (20) |  |  |  |  | 46 | (3) | 210 | (20) |
| PA-12 + 5% BM | 600 | (30) | 37 | (1) | 18.4 | (0.8) | 52 | (1) | 167 | (8) |
| PA-12 + 15% BM | 330 | (20) |  |  |  |  | 52 | (1) | 252 | (5) |
| PA-6$^{(iii)}$ | 1480 | (30) | 76 | (2) | 6.2 | (0.1) | 73 | (3) | 225 | (3) |
| PA-6 + 5% AS | 1480 | (50) | 62 | (2) | 6.2 | (0.1) | 65 | (5) | 214 | (7) |
| PA-6 + 15% AS | 680 | (30) | 41 | (1) | 30 | (1) | 69 | (6) | 300 | (30) |
| PA-6$^{(iv)}$ | 1550 | (50) | 78 | (3) | 6.1 | (0.2) | 50 | (2) | 60 | (10) |
| PA-6 + 5% AS | 1520 | (50) | 70 | (2) | 6.2 | (0.2) | 67 | (8) | 230 | (30) |
| PA-6 + 15% AS | 860 | (40) | 47.6 | (0.7) | 23.4 | (0.5) | 74 | (5) | 300 | (20) |
| PA-6 + 5% BH | 1600 | (100) | 74 | (4) | 6.2 | (0.2) | 56 | (7) | 160 | (20) |
| PA-6 + 15% BH | 1030 | (60) | 51 | (2) | 21 | (2) | 72 | (3) | 274 | (8) |
| PA-6 + 5% BM | 1430 | (80) | 63 | (4) | 6.0 | (0.3) | 78 | (3) | 254 | (3) |
| PA-6 + 15% BM | 630 | (40) |  |  |  |  | 68 | (5) | 310 | (30) |
| PA-6,6$^{(v)}$ | 1660 | (60) | 82 | (2) | 6.7 | (0.3) | 54.6 | (0.7) | 40 | (10) |
| PA-6,6 + 5% AS | 1630 | (30) | 78 | (2) | 6.2 | (0.2) | 50 | (2) | 40 | (10) |
| PA-6,6 + 15% AS | 1020 | (50) | 56 | (2) | 21.1 | (0.6) | 44.7 | (0.8) | 90 | (20) |
| PA-6,6 + 5% AY | 1560 | (50) | 74 | (2) | 6.3 | (0.1) | 50 | (2) | 60 | (20) |
| PA-6,6 + 15% AY | 950 | (40) | 54 | (1) | 22.1 | (0.9) | 45 | (2) | 120 | (30) |
| PA-6,6 + 5% BI | 1630 | (40) | 77 | (3) | 6.2 | (0.2) | 51.1 | (0.8) | 60 | (10) |
| PA-6,6 + 15% BI | 880 | (40) | 51 | (1) | 23.4 | (0.9) | 47 | (4) | 170 | (30) |
| PA-6,6 + 5% BM | 1710 | (70) | 76 | (3) | 6.2 | (0.2) | 51 | (2) | 47 | (6) |
| PA-6,6 + 15% BM | 980 | (80) | 56 | (2) | 20 | (2) | 44 | (1) | 83 | (9) |

$^{(i)}$PA-12, Vestamid ® L 1700 Naturfarben, Hüls, with black masterbatch (1%)
$^{(ii)}$PA-12, Vestamid ®L 2141 Schwarz, Hüls
$^{(iii)}$PA-6, Ultramid ® B 3 Natur, BASF, with black masterbatch (1%)
$^{(iv)}$PA-6, Ultramid ® B 35W Schwarz, BASF

TABLE V-continued

| Nature of the compositions and amounts of plasticizer | Modulus of elasticity in MPa | Yield stress in MPa | Elongation at yield stress in % | Breaking stress in MPa | Elongation at break in % |
|---|---|---|---|---|---|

(v)PA-6,6, Ultramid ® AHH Schwarz, BASF
The compositions labelled "*" are tested by way of comparison.

The results in Table V show that the plasticizing effect of sulphonamides on polyamide-12 is identical to that of BBSA in the sense that a continual fall in the modulus of elasticity is observed following the incorporation of the abovementioned plasticizers. The modulus falls by ⅔ of its value in the presence of 15% of plasticizer. The elongation at break increases in the same way. Moreover, these products also show an appreciable plasticizing effect on polyamide-6 and -6,6 in the sense that their modulae of elasticity fall accordingly. Their elongations at break increase as in the preceding case.

The person skilled in the art will recognize in the other values mentioned in the table the features characteristic of plasticizing effects which are well known in the state of the art.

EXAMPLE 6

Tensile Tests on Compositions Containing a Polyketone

The mechanical properties of samples prepared as in Example 2 at a processing temperature of 250° C. were evaluated. The polyketone used is the reaction product of a mixture of carbon monoxide, ethene and propene which is prepared as described in Example 1 of Patent Application EP 485,058. By applying ISO Standard 527-1 to test specimens of type 5 A obtained by stamping from the rolled sheet (ISO 527-2), the modulus of elasticity, the yield stresses and the elongation at yield stress were evaluated at room temperature. To do this, a drawing rate of 50 mm per minute was used. The results are reported in Table VI. In this table:

- the first column indicates the nature of the constituents of the compositions tested (PK represents the polyketone, BBSA and AS have the meaning given above) and the amount of plasticizer;
- the second column gives the value of the modulus of elasticity in MPa;
- the third column gives the value of the yield stress in MPa;
- the fourth column gives the value of the elongation at yield stress in %.

Throughout Table VI, the figures between brackets indicate the standard deviations.

TABLE VI

| Nature of the compositions and amount of plasticizer | Modulus of elasticity (MPa) | Yield stress (MPa) | Elongation at yield stress (%) |
|---|---|---|---|
| PK | 1840 (30) | 70 (2) | 14.2 (0.5) |
| PK + 15% BBSA* | 760 (10) | 45.1 (0.5) | 25.4 (0.5) |
| PK + 15% AS | 700 (20) | 42.8 (0.7) | 24 (2) |

*Composition tested by way of comparison.

The results in Table VI show that the effect of AS on the polyketone is slightly better than that of BBSA, in the sense that a continual fall in the modulus of elasticity is observed following the incorporation of the abovementioned plasticizers. The modulus falls by ½ of its value in the presence of 15% of plasticizer. In the same way, the elongation at yield stress increases. In addition, less AS than BBSA is lost during the processing.

EXAMPLE 7

Tensile Tests on Polyoxymethylene and Poly (vinylidene fluoride) Compositions The mechanical properties of polyoxymethylene (POM) and of poly(vinylidene fluoride) (PVDF) samples prepared as in Example 4 were evaluated, the processing temperature, however, being 220° C. By applying ISO Standard 527-1 to type 5 A (ISO 527-2) test specimens, the modulus of elasticity, the yield stress, the breaking stress, the elongation at yield stress and the elongation at break were evaluated at room temperature. To do this, a drawing rate of 50 mm per minute was used. The results are reported in Table VII. In this table:

- the first column indicates the nature of the constituents of the compositions tested (POM, PVDF and AS have the meaning given above) and the amount of plasticizer;
- the second column gives the value of the modulus of elasticity in MPa;
- the third column gives the value of the yield stress in MPa;
- the fourth column gives the value of the elongation at yield stress in %;
- the fifth column gives the breaking stress in MPa;
- the sixth column gives the elongation at break in %.

Throughout Table VII, the figures between brackets indicate the standard deviations.

TABLE VII

| Nature of the compositions and amounts of plasticizer | Modulus of elasticity in Mpa | | Yield stress in MPa | | Elongation at yield stress in % | | Breaking stress in MPa | | Elongation at break in % | |
|---|---|---|---|---|---|---|---|---|---|---|
| POM | 1920 | (60) | 56 | (2) | 8.7 | (0.6) | 49 | (6) | 22 | (9) |
| POM + 15% AS | 1070 | (50) | 38 | (1) | 11 | (2) | 36 | (1) | 40 | (30) |
| PVDF | 2100 | (100) | 62 | (3) | 6.6 | (0.3) | 42 | (3) | 70 | (30) |
| PVDF + 15% AS | 1480 | (80) | 45 | (2) | 6.5 | (0.6) | 60 | (10) | 280 | (40) |

The results of Table VII show that the effect of the sulphonamide AS on POM and PVDF is appreciable. The modulus falls by half its value in the presence of 15% of AS for POM and by a quarter for PVDF. In the same way, the elongation at break increases by a very large amount for PVDF.

The person skilled in the art will recognize in the other values mentioned in the table the features characteristic of plasticizing effects which are well known in the state of the art.

EXAMPLE 8

Accelerated Ageing Test

The plasticized polyamide samples needed for the accelerated ageing tests were prepared as in Example 4. The sample thus obtained (of S type as described in ASTM Standard D 1822) is placed in an oven held at a constant temperature of 76° C. The samples are weighed at known intervals in order to determine their loss in weight as a function of time. The results are given in Tables VIII a and b, in which:

- the first column indicates the number of days after which the weight of the sample is determined;
- the second column indicates the loss in weight of a sample of a polyamide-12 (PA-12) which does not contain plasticizer, expressed as residual percentage with respect to the amount employed;
- the third column indicates, in the same way as the second column, the loss in weight of a polyamide-12 sample initially containing 15% by weight of N-n-butylbenzenesulphonamide (BBSA) with respect to the whole weight of the composition;
- the fourth column indicates, in the same way as column 2, the loss in weight of a polyamide-12 sample initially containing 15% by weight of N-(2-hydroxyethyl) benzenesulphonamide (AS)
- the fifth column indicates, in the same way as the second column, the loss in weight of a polyamide-6 sample which does not contain plasticizer;
- the sixth column indicates, in the same way as column 2, the loss in weight of a polyamide-6 sample initially containing 15% by weight of N-(2-hydroxyethyl) benzenesulphonamide (AS).

TABLE VIIIa

| Days | PA-12 | PA-12 + 15% BBSA* | PA-12 + 15% AS | PA-6 | PA-6 + 15% AS |
|---|---|---|---|---|---|
| 0 | 100 | 100 | 100 | 100 | 100 |
| 3 | 99.9 | 99.5 | 99.8 | 99.8 | 99.7 |
| 10 | 99.9 | 98.8 | 99.9 | 99.9 | 99.7 |
| 17 | 99.9 | 97.9 | 99.8 | 99.8 | 99.6 |
| 24 | 99.9 | 96.3 | 99.7 | 99.9 | 99.6 |
| 44 | 99.8 | 94.6 | 99.5 | 99.8 | 99.4 |
| 109 | 99.8 | 92.0 | 99.2 | 99.7 | 99.2 |
| 191 | 99.8 | 90.4 | 98.9 | 99.8 | 99.1 |
| 209 | 99.8 | 90.0 | 98.9 | 99.7 | 99.0 |
| 277 | 99.8 | 89.2 | 98.7 | 99.7 | 99.0 |

The sample labelled "*" is given by way of comparison

TABLE VIIIb

| Days | PA-12 + 15% AY | PA-6, 6 | PA-6, 6 + 15% AS | PA-6, 6 + 15% BI |
|---|---|---|---|---|
| 0 | 100 | 100 | 100 | 100 |
| 3 | 99.9 | 99.9 | 99.8 | 99.8 |
| 21 | 98.8 | 99.9 | 99.8 | 99.7 |
| 89 | 99.8 | 99.9 | 99.8 | 99.7 |

Tables VIIIa and VIIIb show that the loss in weight is much faster for the polyamide-12 sample initially containing 15% of BBSA than for the same polyamide initially containing 15% of AS or 15% of AY. After 277 days at 76° C., for example, 10.8% of the 15% of BBSA present at the beginning has disappeared, whereas only 1.3% of the AS has disappeared, with respect to the initial 15%, after the same period of time. This is explained by a much faster evaporation from the BBSA than of the AS from the polyamide-12. It should be noted that the loss in weight of 0.2% from the control polyamide-12 is really due to the loss of water, The same applies for the plasticized compositions based on PA-6 and on PA-6,6.

What is claimed is:

1. A thermal stable composition comprising at least one polymer and at least one plasticizer, wherein
   a. the polymer is semi-crystalline and exhibits a processing temperature equal to or greater than 220° C. and is polyamide-6, polyamide-6,6, polyamide-4,6, polyamide-6,9, polyamide-6,10, polyamide-6,12, polyamide-11 or polyamide-12;
   b. the plasticizer is an aromatic benzenesulphonamide, wherein the aromatic benzenesulphonamide is N-(2-hydroxyethyl)benzenesulphonamide, N-(3-hydroxypropyl)benzenesulphonamide, or N-(2-acetoxyethyl)benzenesulphonamide; and
   c. the plasticizer is incorporated into the polymer by mixing in the molten state in an amount of 2% to 30% by weight with respect to the total weight of the composition.

2. A composition according to claim 1, wherein the semi-crystalline polymer exhibits a processing temperature equal to or greater than 250° C.

3. A composition according to claim 1, wherein the aromatic benzene-sulphonamide is used in an amount of 5% to 20% by weight with respect to the total weight of the composition.

4. A composition according to claim 1, wherein the composition also comprises an inorganic filler, processing aid, antioxidant or UV stabilizer.

5. A process for the preparation of an article, which comprises processing a thermal stable composition comprising at least one polymer and at least one plasticizer, wherein
   a. the polymer is semi-crystalline and exhibits a processing temperature equal to or greater than 220° C. and is polyamide-6, polyamide-6,6, polyamide-4,6, polyamide-6,9, polyamide-6,10, polyamide-6,12, polyamide-11 or polyamide-12;
   b. the plasticizer is an aromatic benzenesulphonamide represented by the general formula (I)

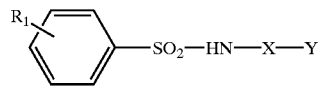
(I)

in which
$R_1$ represents a hydrogen atom, a $C_1$–$C_4$ alkyl group or a $C_1$–$C_4$ alkoxy group,
X represents
  a linear or branched $C_2$–$C_{10}$ alkylene group, or
  a cycloaliphatic group, or
  an aromatic group,
Y represents one of the groups OH or

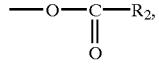

$R_2$ represents a $C_1$–$C_4$ alkyl group or an aromatic group, these groups being unsubstituted or substituted by an OH or $C_1$–$C_4$ alkyl group; and
   c. the plasticizer is incorporated into the polymer by mixing in the molten state in an amount of 2% to 30% by weight with respect to the total weight of the composition, by extrusion, injection or extrusion blow-molding.

6. An article obtained according to the process of claim 5.

7. A process according to claim 6, wherein the article is a hydraulic brake, a cable, a pipe, a tube, or a tank.

8. An article according to claim 6, wherein the article is a hydraulic brake, a cable, a pipe, a tube, or a tank.

9. A process according to claim 5, wherein the semi-crystalline polymer exhibits a processing temperature equal to or greater than 250° C.

10. A process according to claim 5, wherein in the benzenesulphonamide of formula (I):
    $R_1$ represents a hydrogen atom or a methyl or methoxy group,
    X represents a linear or branched $C_2$–$C_{10}$ alkylene group or a phenyl group,
    Y represents an OH or —O—CO—$R_2$ group, and
    $R_2$ represents a methyl or phenyl group, the latter being unsubstituted or substituted by an OH or methyl group.

11. A process according to claim 5, wherein the aromatic benzenesulphonamide of formula (I) is
N-(2-hydroxyethyl)benzenesulphonamide,
N-(3-hydroxypropyl)benzenesulphonamide,
N-(2-hydroxyethyl)-p-toluenesulphonamide,
N-(4-hydroxyphenyl)benzenesulphonamide,
N-[(2-hydroxy-1-hydroxymethyl-1-methyl)ethyl]-benzenesulphonamide,
N-[5-hydroxy-1,5-dimethylhexyl]benzenesulphon-amide,
N-(2-acetoxyethyl)benzenesulphonamide,
N-(5-hydroxypentyl)benzenesulphonamide,
N-[2-(4-hydroxybenzoyloxy)ethyl]benzenesulphonamide,
N-[2-(4-methylbenzoyloxy)ethyl]benzenesulphonamide,
N-(2-hydroxyethyl)-p-methoxybenzenesulphonamide, or
N-(2-hydroxypropyl)benzenesulphonamide.

12. A process according to claim 5, wherein the aromatic benzenesulphonamide of formula (I) is
N-(2-hydroxyethyl)benzenesulphonamide,
N-(3-hydroxypropyl)benzenesulphonamide, or
N-(2-acetoxyethyl)benzenesulphonamide 13. A process according to claim 5, wherein the aromatic benzenesulphonamide of formula (I) is used in an amount of 5% to 20% by weight with respect to the total weight of the composition.

14. A process according to claim 5, wherein the composition also comprises an inorganic filler, processing aid, antioxidant or UV stabilizer.

* * * * *

UNITED STATES PATENT AND TRADEMARK OFFICE
CERTIFICATE OF CORRECTION

PATENT NO. : 6,624,218 B2  Page 1 of 1
DATED : September 23, 2003
INVENTOR(S) : August Van Gysel et al.

It is certified that error appears in the above-identified patent and that said Letters Patent is hereby corrected as shown below:

<u>Title page,</u>
Item [63], Related U.S. Application Data, "Jun 4, 1997," should read
-- Jul. 4, 1997, --.

<u>Column 18,</u>
Line 1, "claim 6," should read -- claim 5, --.
Line 37, "N-(2-acetoxyethyl)benzenesulphonamide" should read
-- N-(2-acetoxyethyl)benzenesulphonamide. --.

Signed and Sealed this

Twenty-third Day of March, 2004

JON W. DUDAS
*Acting Director of the United States Patent and Trademark Office*